(12) United States Patent
Lehti et al.

(10) Patent No.: US 11,873,033 B2
(45) Date of Patent: Jan. 16, 2024

(54) FOLDING VEHICLE TAILGATE ASSEMBLY

(71) Applicant: Multimatic Inc., Markham (CA)

(72) Inventors: Michael Gordon Lehti, Ashburn (CA); Scott David Worden, Unionville (CA)

(73) Assignee: Multimatic Inc., Markham (CA)

( * ) Notice: Subject to any disclaimer, the term of this patent is extended or adjusted under 35 U.S.C. 154(b) by 0 days.

(21) Appl. No.: 17/927,725

(22) PCT Filed: Jun. 4, 2021

(86) PCT No.: PCT/CA2021/050775
§ 371 (c)(1),
(2) Date: Nov. 24, 2022

(87) PCT Pub. No.: WO2021/243472
PCT Pub. Date: Dec. 9, 2021

(65) Prior Publication Data
US 2023/0192200 A1    Jun. 22, 2023

Related U.S. Application Data

(60) Provisional application No. 63/034,519, filed on Jun. 4, 2020.

(51) Int. Cl.
*B62D 33/00* (2006.01)
*B62D 33/037* (2006.01)
(Continued)

(52) U.S. Cl.
CPC ........... *B62D 33/037* (2013.01); *B60N 3/023* (2013.01); *B60R 3/02* (2013.01)

(58) Field of Classification Search
CPC ...... B60R 3/02; B62D 33/0273; B62D 33/03; B62D 33/023; B62D 33/027; B62D 33/037
See application file for complete search history.

(56) References Cited

U.S. PATENT DOCUMENTS 5,478,130 A * 12/1995 Matulin ............. B62D 33/0273
296/57.1
5,673,960 A * 10/1997 Sorensen ............. B60P 1/4492
296/57.1
(Continued)

OTHER PUBLICATIONS

International Search Report and Written Opinion for International Application No. PCT/CA2021/050775, dated Oct. 27, 2022.
(Continued)

*Primary Examiner* — Chi Q Nguyen
(74) *Attorney, Agent, or Firm* — Borden Ladner Gervais LLP; Brandon L. Evenson

(57) ABSTRACT

A vehicle tailgate assembly primarily for pick-up trucks comprises a frame with a transverse base and support arms extending perpendicularly therefrom adjacent distal ends of the base. A tailgate door is rotationally mounted to the frame between the support arms. The door comprises a transverse upper section rotationally joined to a transverse lower section at a rotational joint, preferably a hinge. A releasable locking mechanism is located adjacent the rotational joint to releasably hold the upper section in relation to the lower section at selected orientations. An additional locking mechanism may selectively hold the lower section and/or the upper section to the support arms. The tailgate may also be provided with an extendible tailgate which may be rotated interiorly and exteriorly of the plane of the upper section. An extendible handle may also be provided to support user entry and exit from a cargo hold of the truck.

16 Claims, 19 Drawing Sheets

(51) Int. Cl.
*B60N 3/02* (2006.01)
*B60R 3/02* (2006.01)

(56) References Cited

U.S. PATENT DOCUMENTS

| | | | | |
|---|---|---|---|---|
| 6,131,980 | A * | 10/2000 | Sankrithi | B60P 3/42 |
| | | | | 296/26.11 |
| 6,742,822 | B2 * | 6/2004 | Vejnar | B62D 33/0273 |
| | | | | 296/26.11 |
| 6,764,123 | B1 | 7/2004 | Bilyad | |
| 8,201,869 | B1 * | 6/2012 | Butlin, Jr. | B60R 3/02 |
| | | | | 296/57.1 |
| 8,740,279 | B1 * | 6/2014 | McGoff | B62D 33/0273 |
| | | | | 49/168 |
| 10,994,661 | B2 * | 5/2021 | Mamo | B60R 7/08 |
| 11,505,261 | B2 * | 11/2022 | Van Norman | B62D 33/037 |
| 11,643,151 | B2 * | 5/2023 | Nania | B60R 3/02 |
| | | | | 296/51 |
| 2002/0121794 | A1 | 9/2002 | Vejnar | |
| 2012/0126564 | A1 | 5/2012 | Hausler et al. | |
| 2016/0075286 | A1 * | 3/2016 | Butlin, Jr. | B62D 33/03 |
| | | | | 296/50 |
| 2019/0054961 | A1 | 2/2019 | Ngo | |
| 2019/0389388 | A1 * | 12/2019 | Ngo | B60R 3/02 |
| 2021/0380175 | A1 * | 12/2021 | Jarjoura | B62D 33/037 |
| 2022/0161869 | A1 * | 5/2022 | Nania | B62D 33/0273 |

OTHER PUBLICATIONS

Chinese office action with translation dated Jun. 29, 2023.
Japanese office action with translation dated May 16, 2023.

* cited by examiner

FOLDING VEHICLE TAILGATE ASSEMBLY

FIELD OF THE INVENTION

This invention relates to the field of vehicle tailgates with particular application to tailgates for pick-up trucks.

BACKGROUND TO THE INVENTION

Pick-up trucks generally require tailgates which can open to allow certain access. There has also been a need for versatile, factory installed tailgates which can perform in a number of situations where complete closure of the tailgate, or complete opening of the tailgate to a dropped vertical position, were not ideal.

SUMMARY OF THE INVENTION

Accordingly, it would be desirable to have a tailgate which could be opened in a variety of positions to facilitate secure transportation of oversize cargo or to assist in holding cargo down in windy or bumpy driving conditions with minimal risk to the material. It would also be desirable to have a tailgate which permitted enhanced access of the user to the truck bed. Moreover, a tailgate with an extendible step assembly which is flush with the tailgate body when stowed but deployable in a variety of positions to act as a step or to assist in holding material within the truck bed would be desirable. A deployable handle to support user ingress and egress from a vehicle storage hold with or without use of the step assembly would be useful.

In a principal aspect of the invention, a vehicle tailgate assembly comprises: a frame with a transverse base and support arms extending perpendicularly therefrom adjacent distal ends of the base; a door rotationally mounted to the frame between the support arms; the door comprising a transverse upper section rotationally joined to a transverse lower section at a rotational joint; a releasable locking mechanism located adjacent the rotational joint; said releasable locking mechanism adapted to releasably hold the upper section in relation to the lower section at selected orientations.

In a further aspect of the vehicle tailgate assembly, the upper section and the lower section are aligned linearly when the door is closed and when the door is rotated open perpendicular to the support arms.

In a further aspect of the vehicle tailgate assembly, the lower section is rotated open perpendicular to the support arms and the upper section is rotated downwardly perpendicular to the lower section.

In a further aspect of the vehicle tailgate assembly, the lower section is rotated open perpendicular to the support arms and the upper section is rotated upwardly perpendicular to the lower section.

In a further aspect of the vehicle tailgate assembly, the lower section is closed and parallel to the support arms and the upper section is rotated open perpendicular to the support arms.

In a further aspect of the vehicle tailgate assembly, the upper section is rotationally joined to the lower section by a hinge.

In a further aspect of the vehicle tailgate assembly, the locking mechanism comprises at least one latch.

In a further aspect of the vehicle tailgate assembly, the at least one latch is configured to provide multiple latching positions.

In a further aspect of the vehicle tailgate assembly, an extendible step assembly is mounted within the upper section of the door.

In a further aspect of the vehicle tailgate assembly, the step assembly when extended may be locked into a position on a plane, interiorly of the plane or exteriorly of the plane of the upper section of the door.

In a further aspect of the vehicle tailgate assembly, a lower portion of the upper section is provided with an extendible handle for user support during entry and exit from a vehicle cargo hold.

In a further aspect of the vehicle tailgate assembly, an additional locking mechanism is provided to releasably hold the lower section to the support arms.

In a further aspect of the vehicle tailgate assembly, the additional locking mechanism further releasably holds the upper section to the support arms.

DETAILED DESCRIPTION OF THE INVENTION

Figure 1:
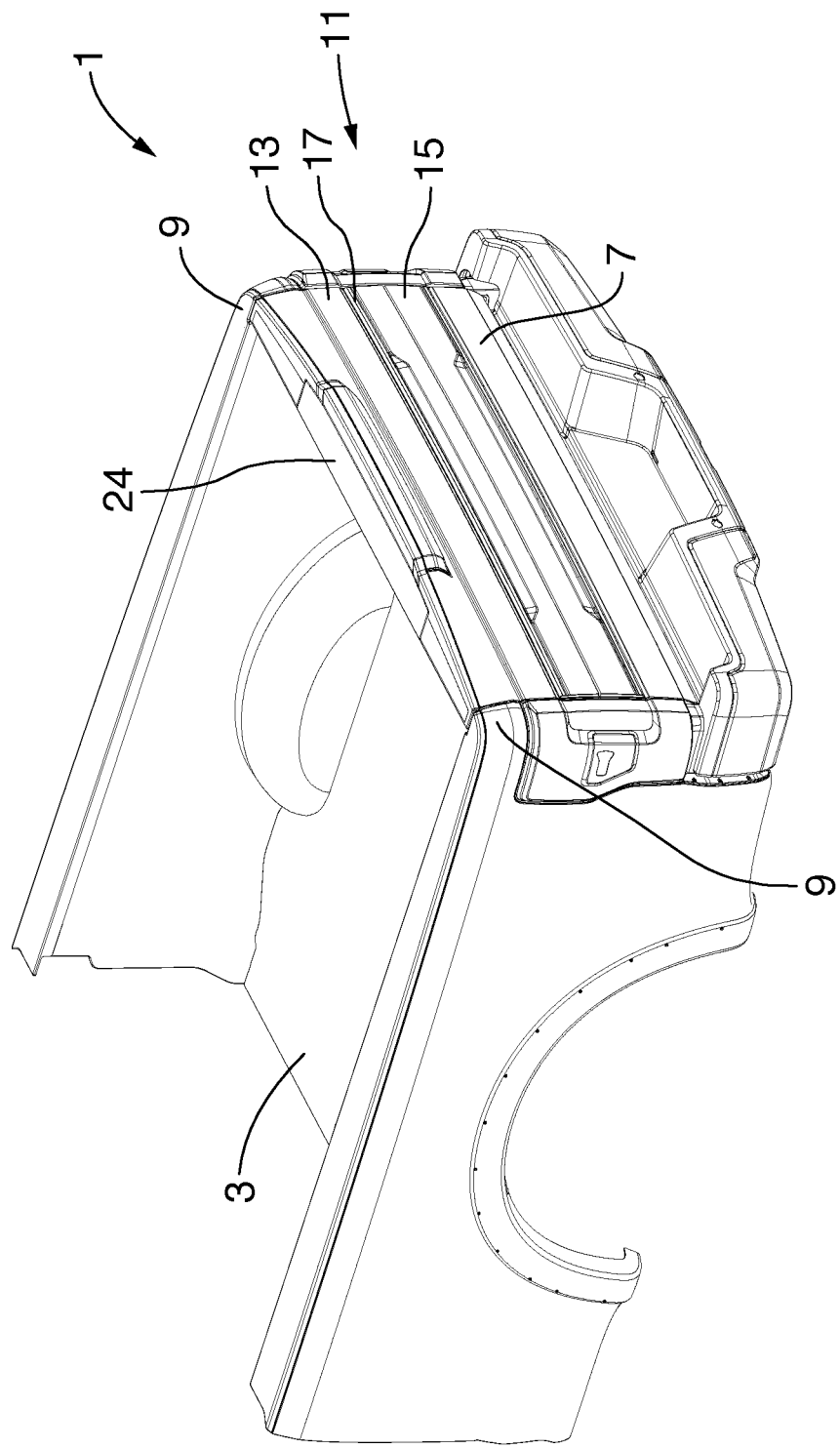
FIG. 1 is a perspective view of the rear of a vehicle illustrating a tailgate assembly with the tailgate closed and vertical.
Figure 2:
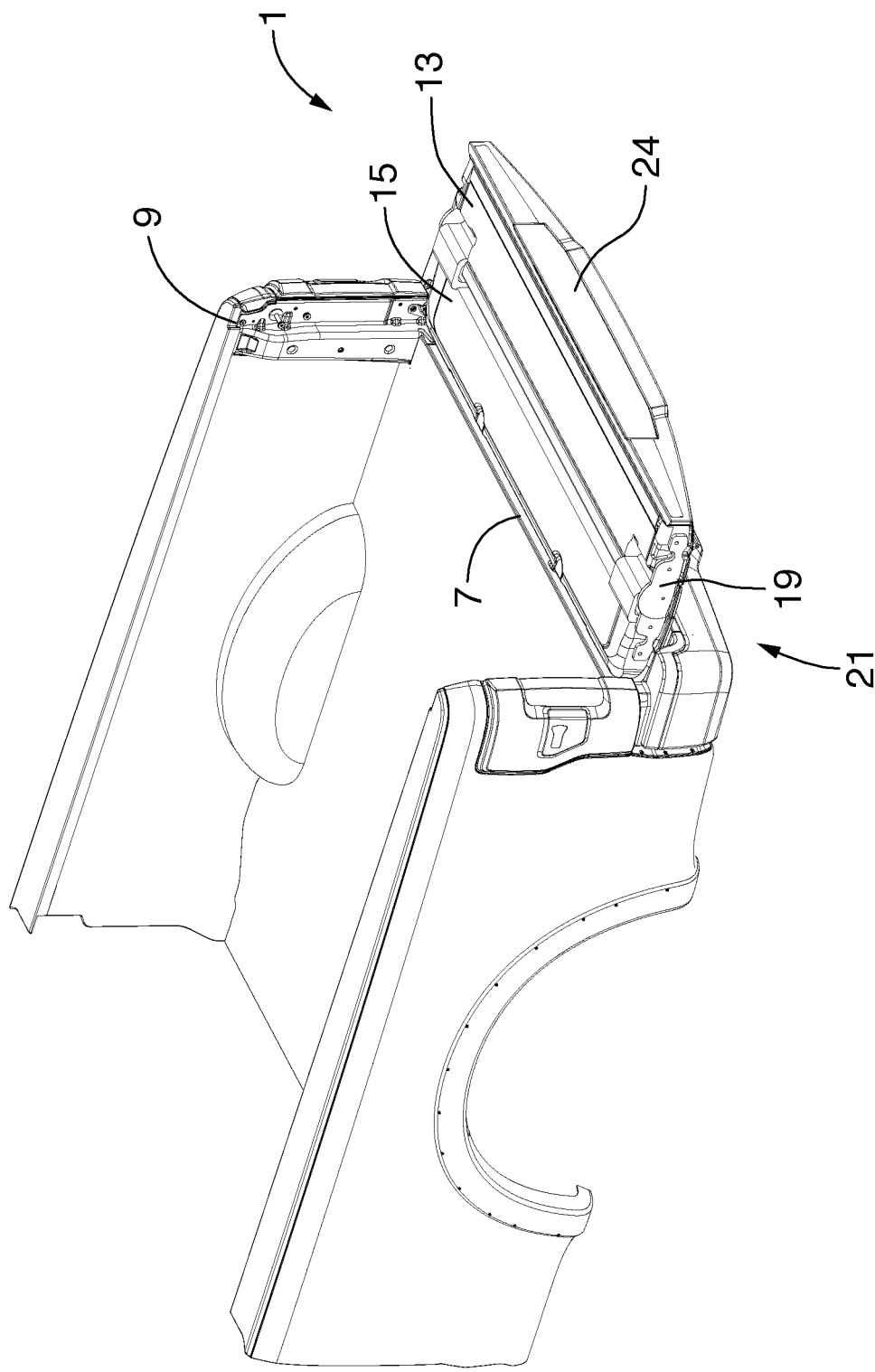
FIG. 2 is the view of FIG. 1 with the tailgate open to horizontal.

A vehicle, typically a pick-up truck, comprises a vehicle cargo hold or truck box 3. At the rear of the cargo hold 3 is provided a frame comprising a transverse structure or base 7 and support arms 9, typically comprising the D-pillars of the vehicle, or portions thereof. An articulated vehicle tailgate or door 11 is rotationally mounted to the base 7 within the confines of the support arms 9. The vehicle door 11 and other components as further described below comprise a vehicle tailgate assembly 1. Support cables 31 provide a connection between the door 11 and the support arms 9.

Figure 3:
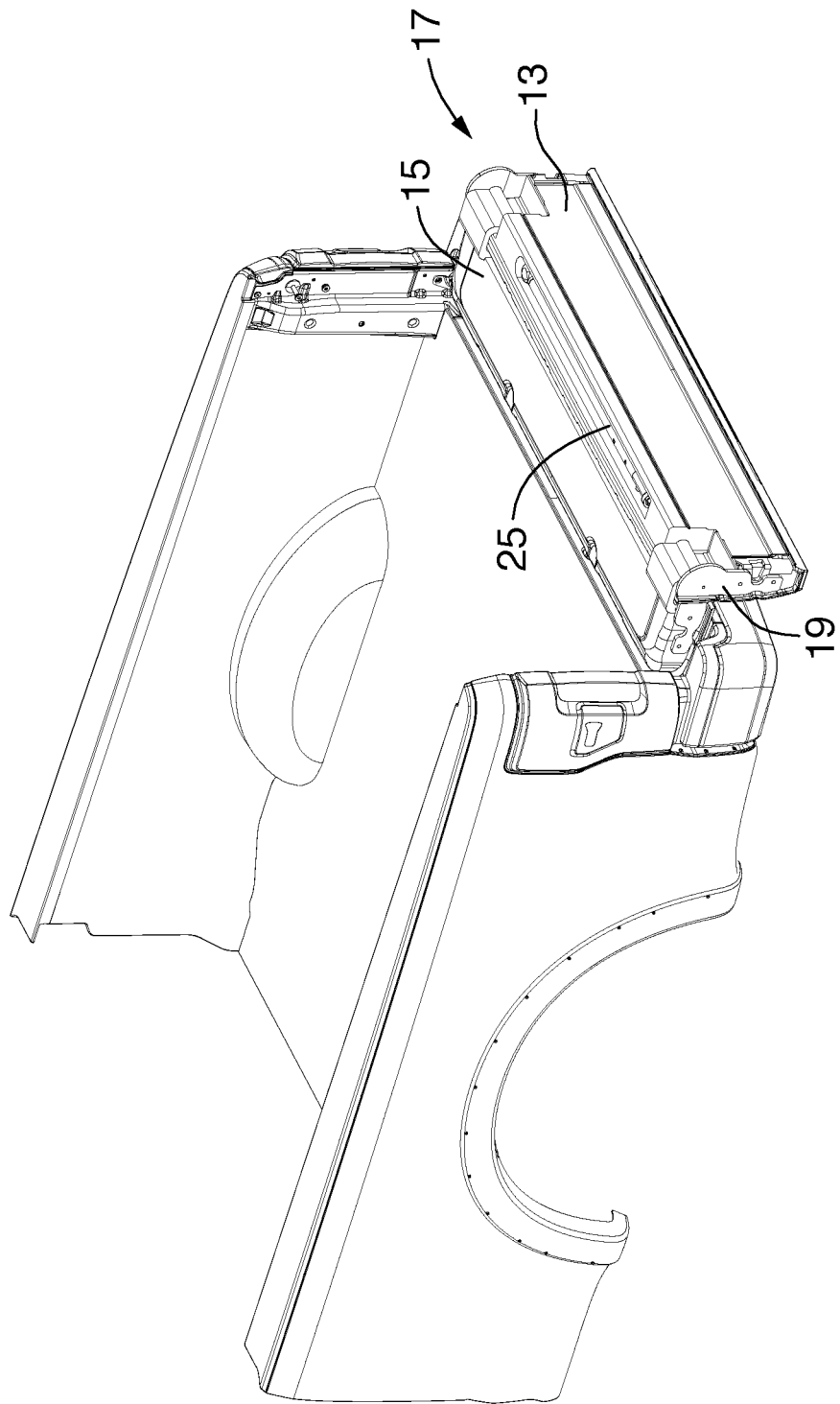
FIG. 3 is the view of FIG. 1 with a lower section of the door of the tailgate assembly horizontal and the upper section of the door rotated exteriorly and downwardly.
Figure 4:
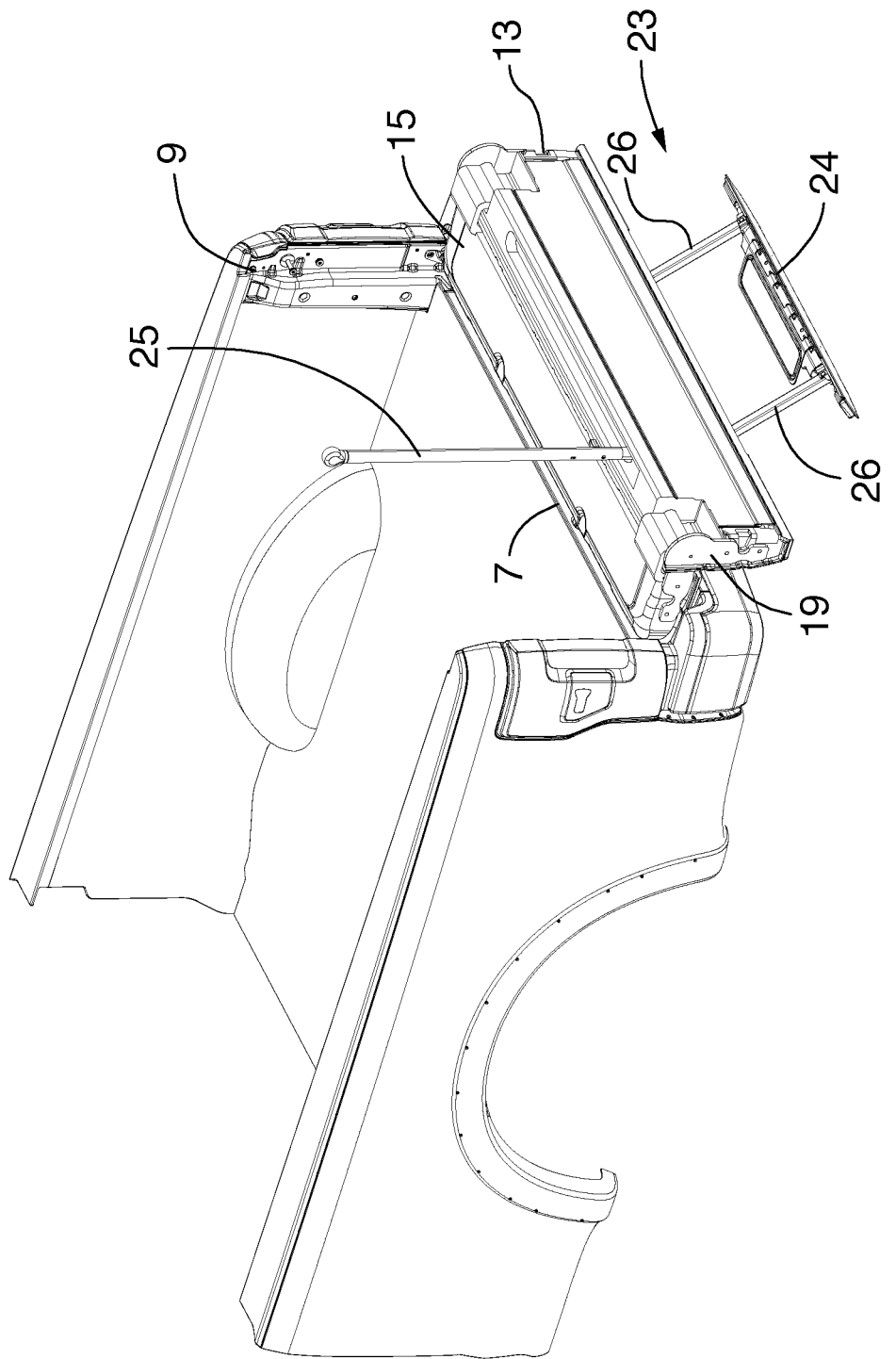
FIG. 4 is the view of FIG. 3 with an extendible step assembly deployed and an extendible handle deployed.
Figure 5:
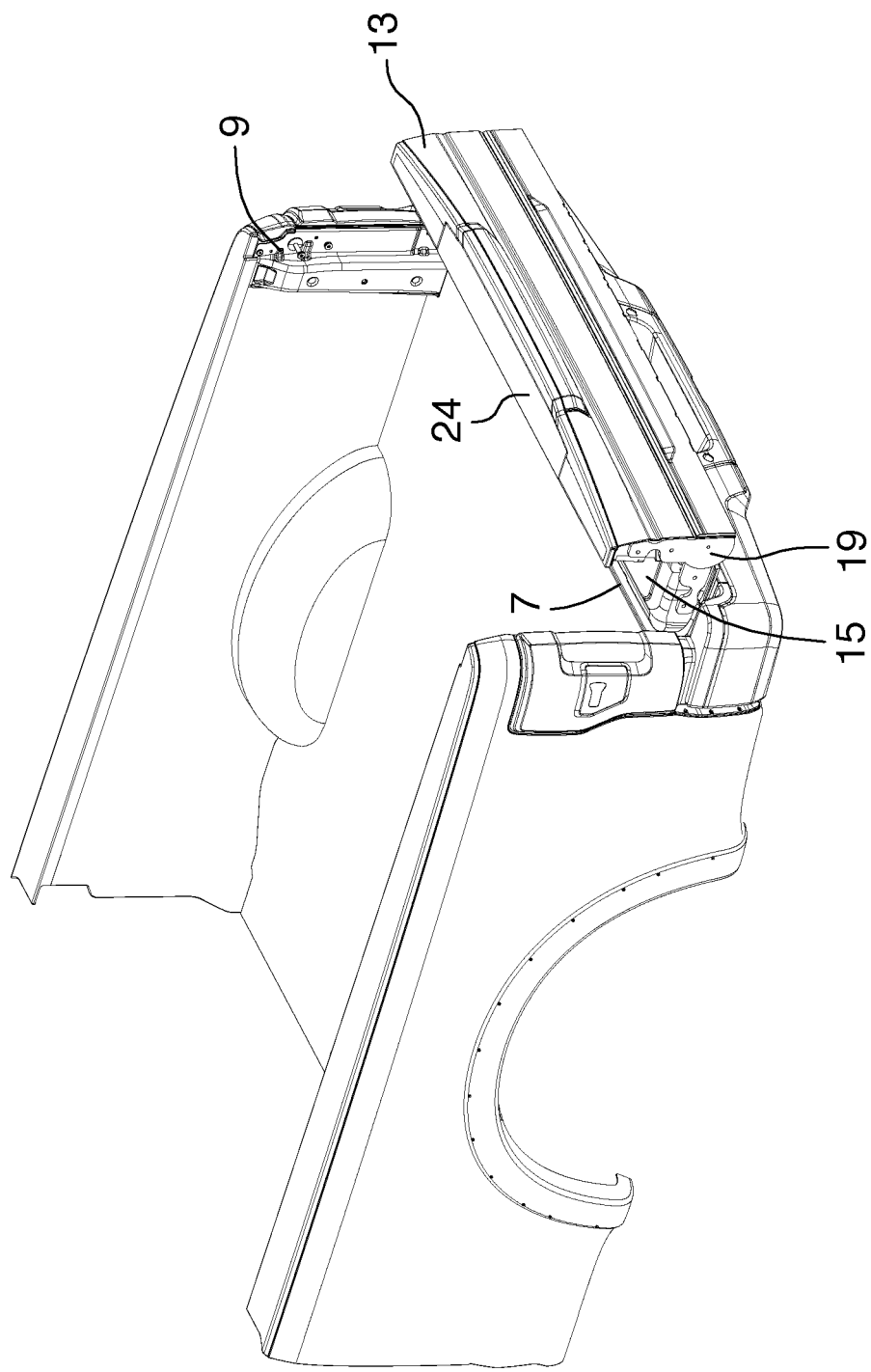
FIG. 5 is the view of FIG. 2 with the upper section rotated interiorly and upwardly.
Figure 6:
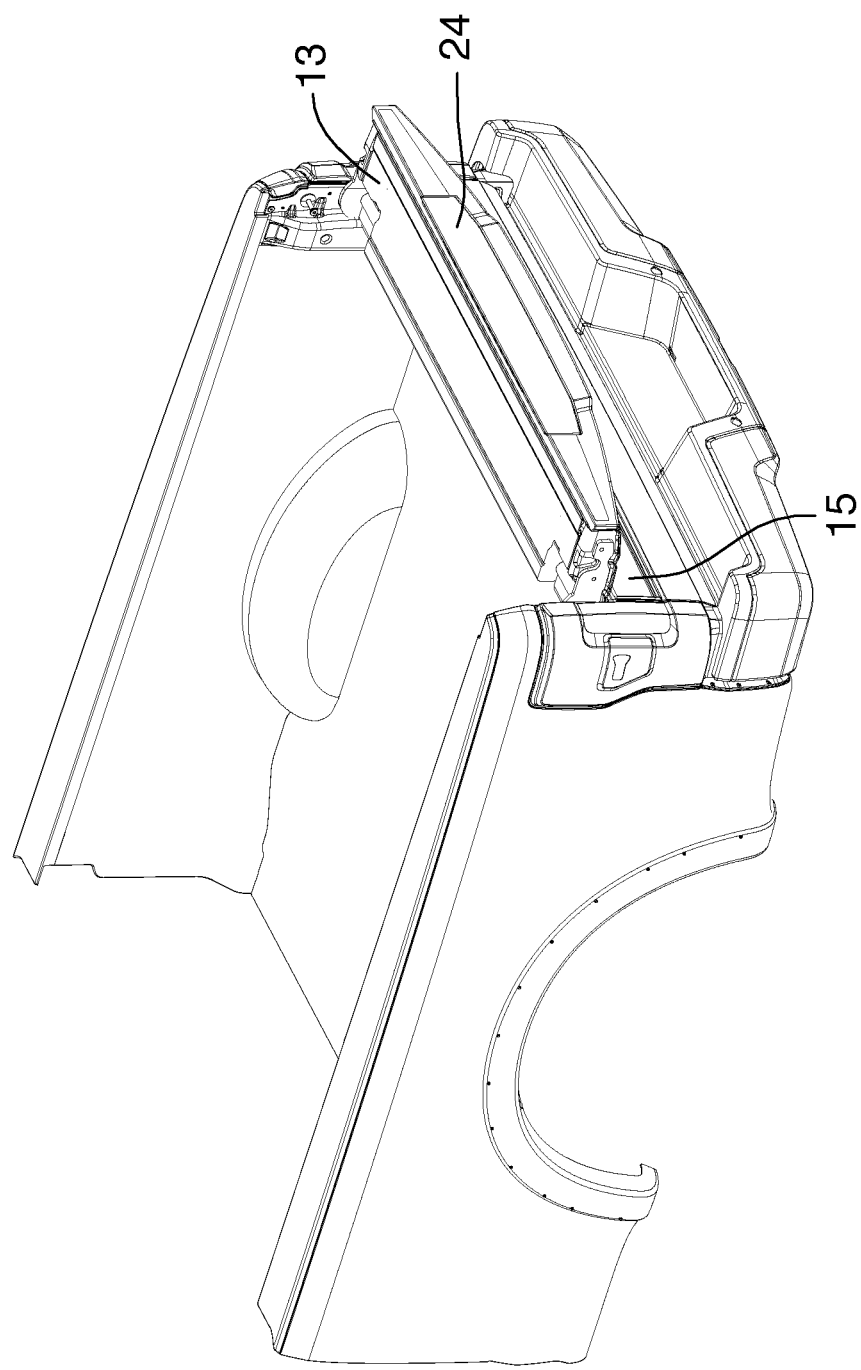
FIG. 6 is the view of FIG. 1 with the upper section rotated exteriorly and horizontally.

The door 11 comprises two main sections, a transverse upper section 13 and a transverse lower section 15. The upper section 13 and lower section 15 are rotationally connected at a rotational joint 17. Typically, the rotational joint 17 comprises a hinge. The upper section 13 and lower section 15 are adapted to assume orientations at various angles in relation to each other in order to perform the desirable functions of the tailgate assembly. This ability to rotate or fold and to assume a desired orientation is facilitated by the use of a locking mechanism 21 which may comprise one or more latches. The locking mechanism 21 may comprise a rotatable latching plate 19 associated with the upper section 13, as further described below. The locking mechanism 21 permits the upper section 13 to be locked in relation to the lower section 15 in a co-planar orientation at 180 degrees as illustrated in FIGS. 1, 2 and 7 to 9, rotated outwardly or exteriorly to a right angle at 270 degrees as illustrated in FIGS. 3, 4 and 6, or rotated inwardly or interiorly at 90 degrees as illustrated in FIG. 5. The lower section 15 is in a horizontal orientation in FIGS. 3, 4 and 5 with the upper section 13 rotated in relation thereto. The lower section 15 is in the closed, vertical orientation in FIG. 6, with the upper section 13 rotated exteriorly to 270 degrees in a horizontal orientation.

In order to facilitate the various orientations of the upper section 13 in relation to the lower section 15 as described above, any suitable latching mechanism may be employed. A preferred representative latching system is illustrated in FIGS. 10 to 14. The latching plate 19 is affixed to the upper section 13. Along with the upper section 13, the latching plate 19 may rotate in relation to the lower section 15 along rotational joint 17. An end of rotational joint 17 is represented as P. Latching plate 19 is provided with three orifices A, B and C. Additional orifices could be added to facilitate additional releasable orientations of the upper section 13 in relation to the lower section 15. The orifices A, B and C are adapted to selectively receive a latching pin 29. Latching pin 29 is spring loaded in cartridge 27 which is fixed in relation to lower section 15. In order to release locking mechanism 21, latching pin 29 may be retracted from any of orifices A, B or C using a conventional, manually-operated latch handle. As the upper section 13 is rotated in relation to the lower section 15, the spring-loaded latching pin 29, which may be resisted by latching plate 19, may be urged into the orifice A, B or C which it next encounters. If the latch handle is kept engaged, on the other hand, the latching pin will not fall into any of the orifices A, B or C. Thus, unwanted latching of the tailgate in an intermediate position or orientation while the upper section 13 is being rotated in relation to the lower section 15 may be avoided.

Figure 9:
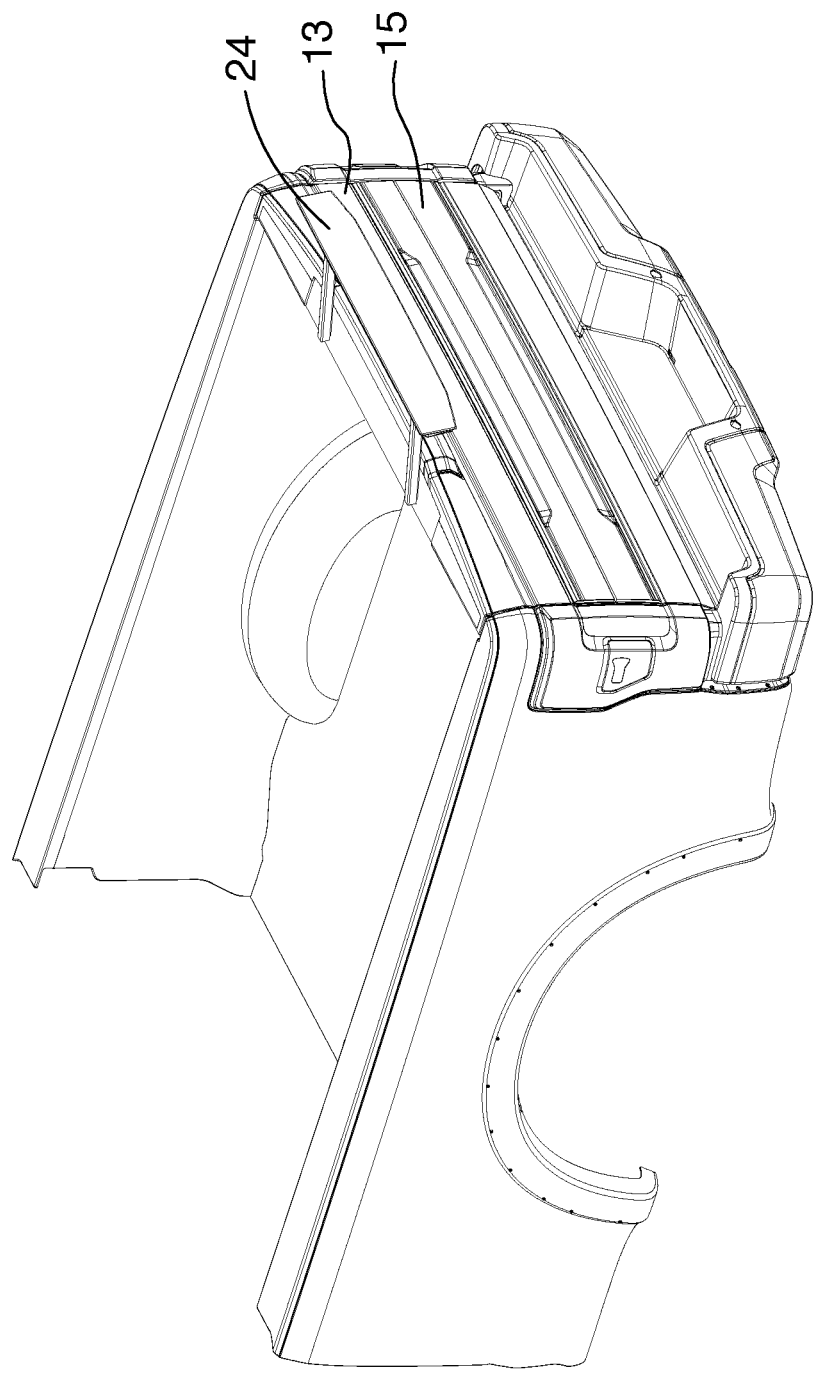
FIG. 9 is the view of FIG. 1 with the step assembly deployed and rotated exteriorly in relation to the upper section.
Figure 10:
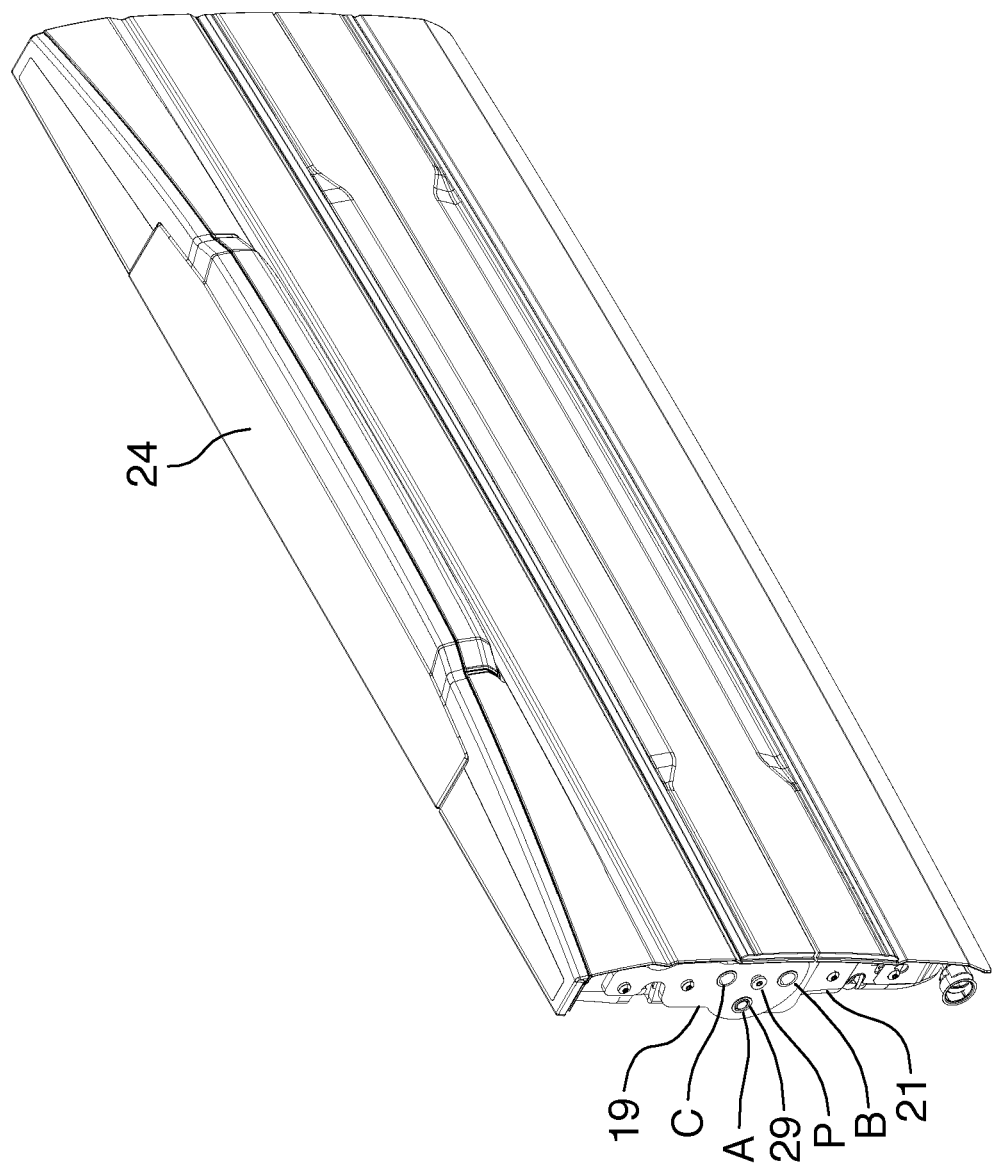
FIG. 10 is an isolated perspective view of the tailgate with the upper section and the lower section co-planar and oriented vertically upward.
Figure 11:
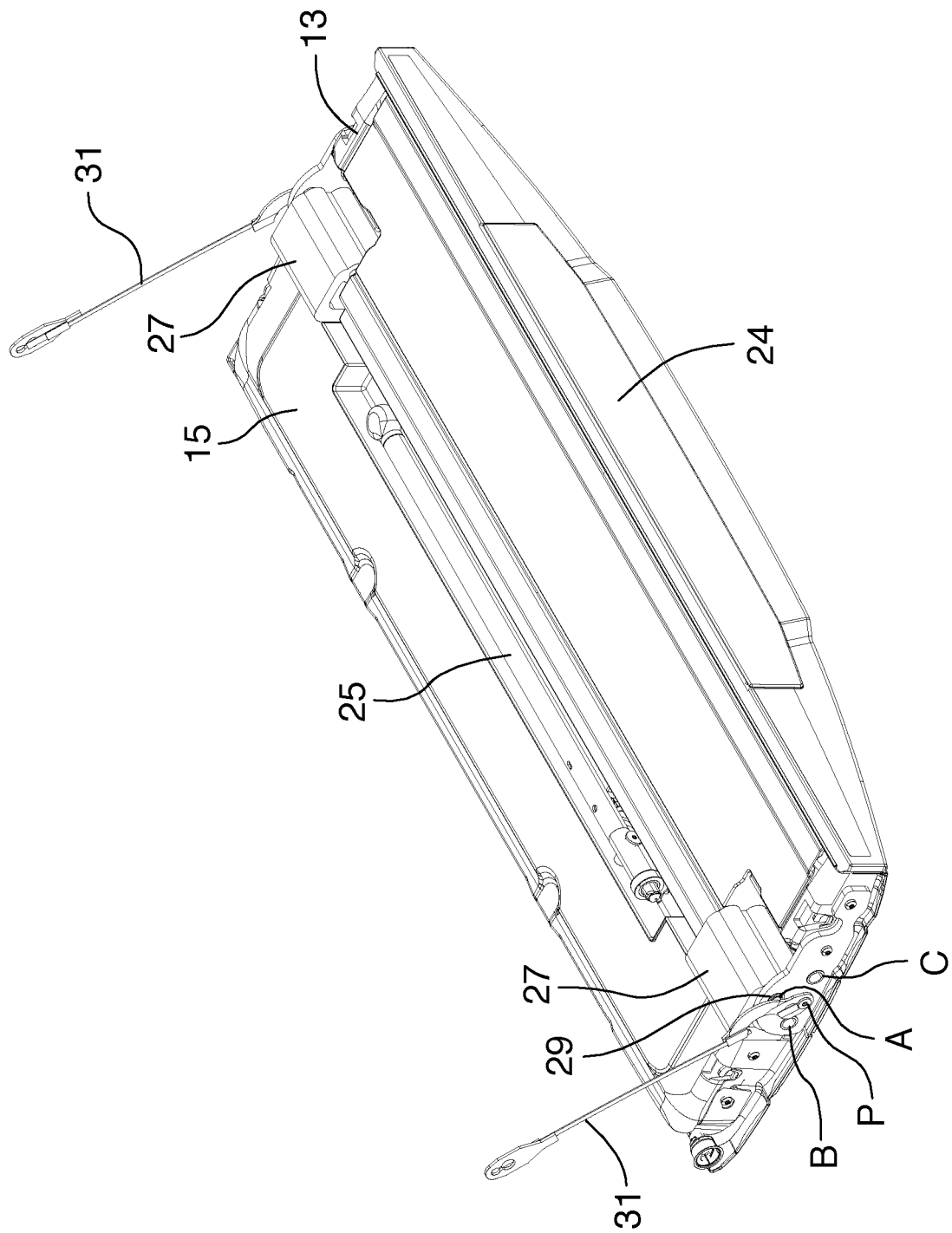
FIG. 11 is an isolated perspective view of the tailgate with the upper section and the lower section co-planar and oriented horizontally.

For example, as illustrated in FIG. 10, the upper section 13 and the lower section 15 are co-planar when the latching pin 29 is releasably captured in orifice A. The FIG. 10 latching configuration applies to the closed tailgate configuration of FIGS. 1 and 9, and to the horizontal tailgate configuration of FIGS. 2, 7 and 8. The horizontal tailgate latching configuration is also illustrated in FIG. 11.

Figure 12:
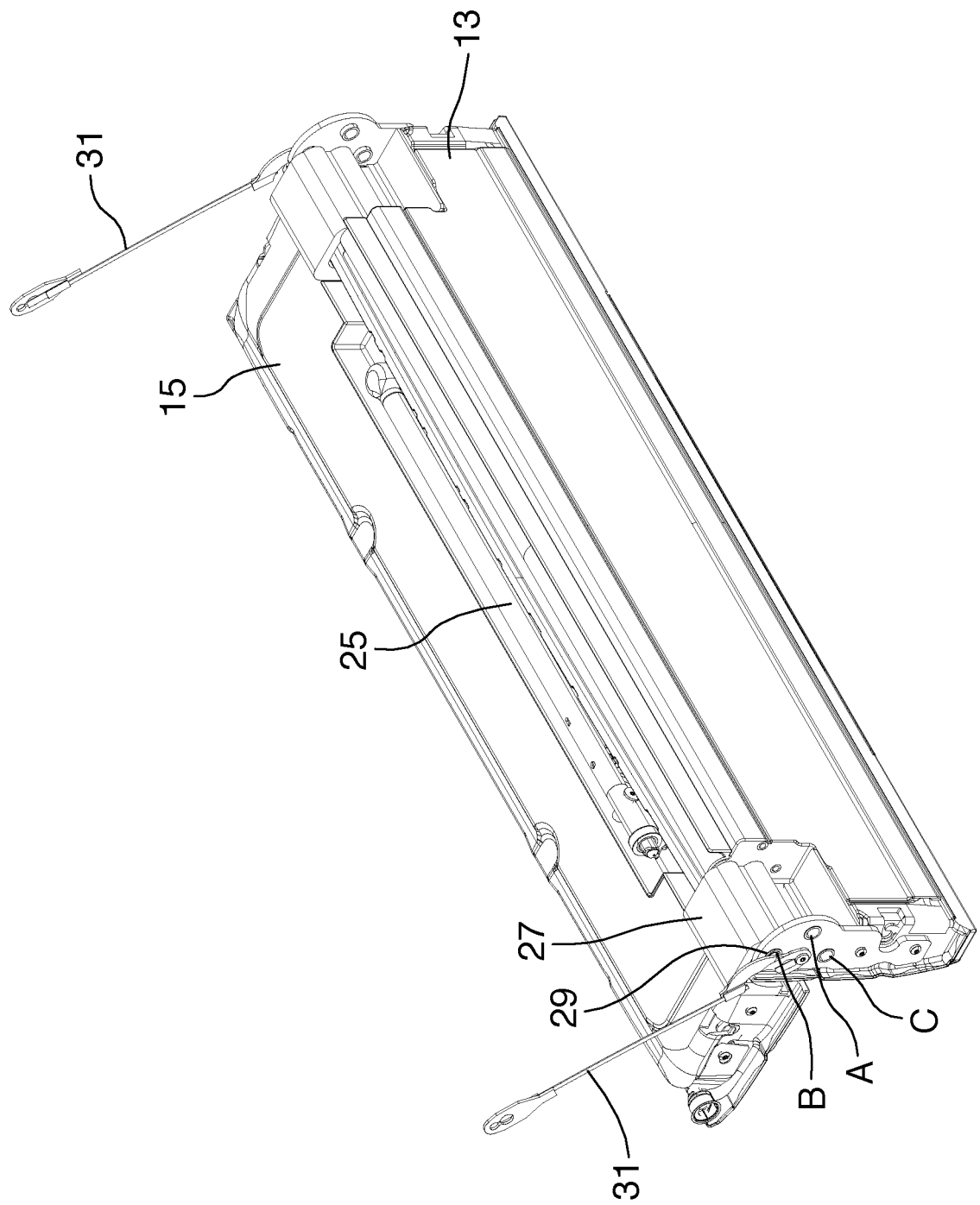
FIG. 12 is an isolated perspective view of the tailgate with the lower section oriented horizontally and the upper section opened outwardly and oriented downwardly.

FIG. 12 illustrates the upper section 13 rotated outwardly or exteriorly in relation to the lower section 15. In this configuration, the latching pin 29 is releasably captured in orifice B. The FIG. 12 latching configuration applies to the tailgate configurations of FIGS. 3 and 4. It would also apply to the tailgate configuration of FIG. 6 although the support cables 31 would be differently oriented. The latching configuration of FIG. 14, with the latching pin 29 releasably captured in orifice B, corresponds more precisely to the tailgate configuration of FIG. 6.

Figure 13:
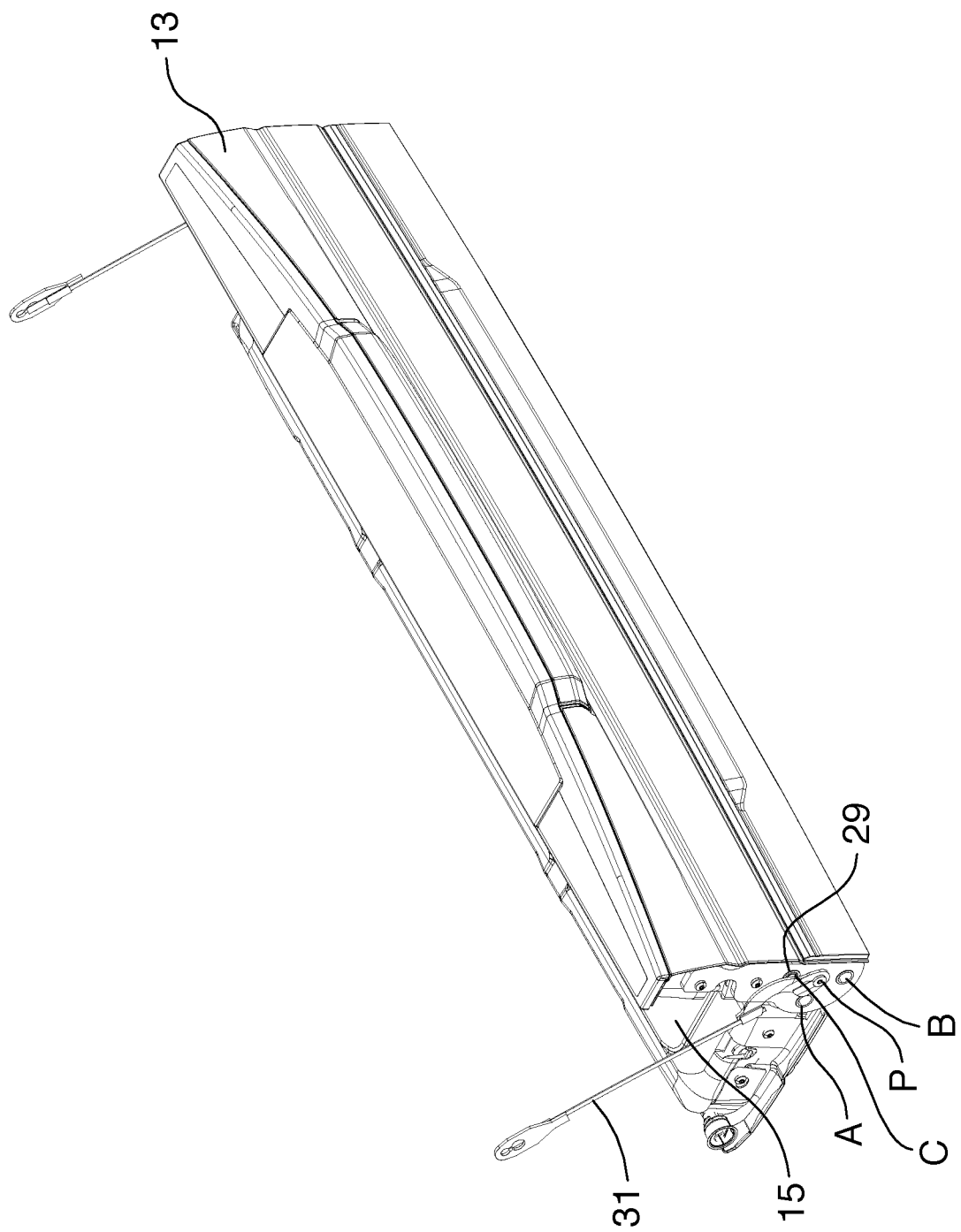
FIG. 13 is an isolated perspective view of the tailgate with the lower section oriented horizontally and the upper section rotated inwardly and oriented upwardly.
Figure 14:
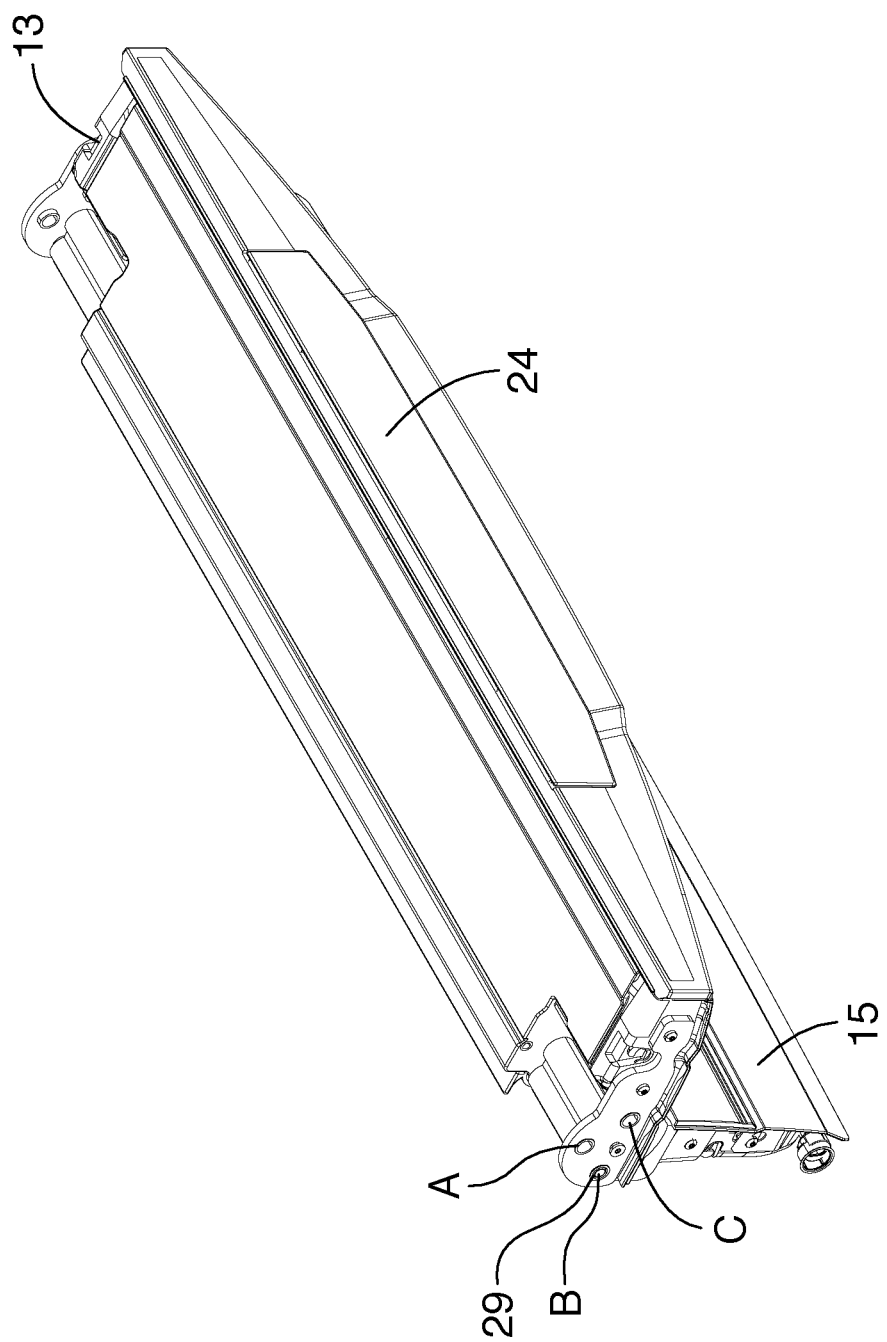
FIG. 14 is an isolated perspective view of the tailgate with the lower section oriented vertically upward and the upper section rotated open and oriented horizontally.
Figure 15:
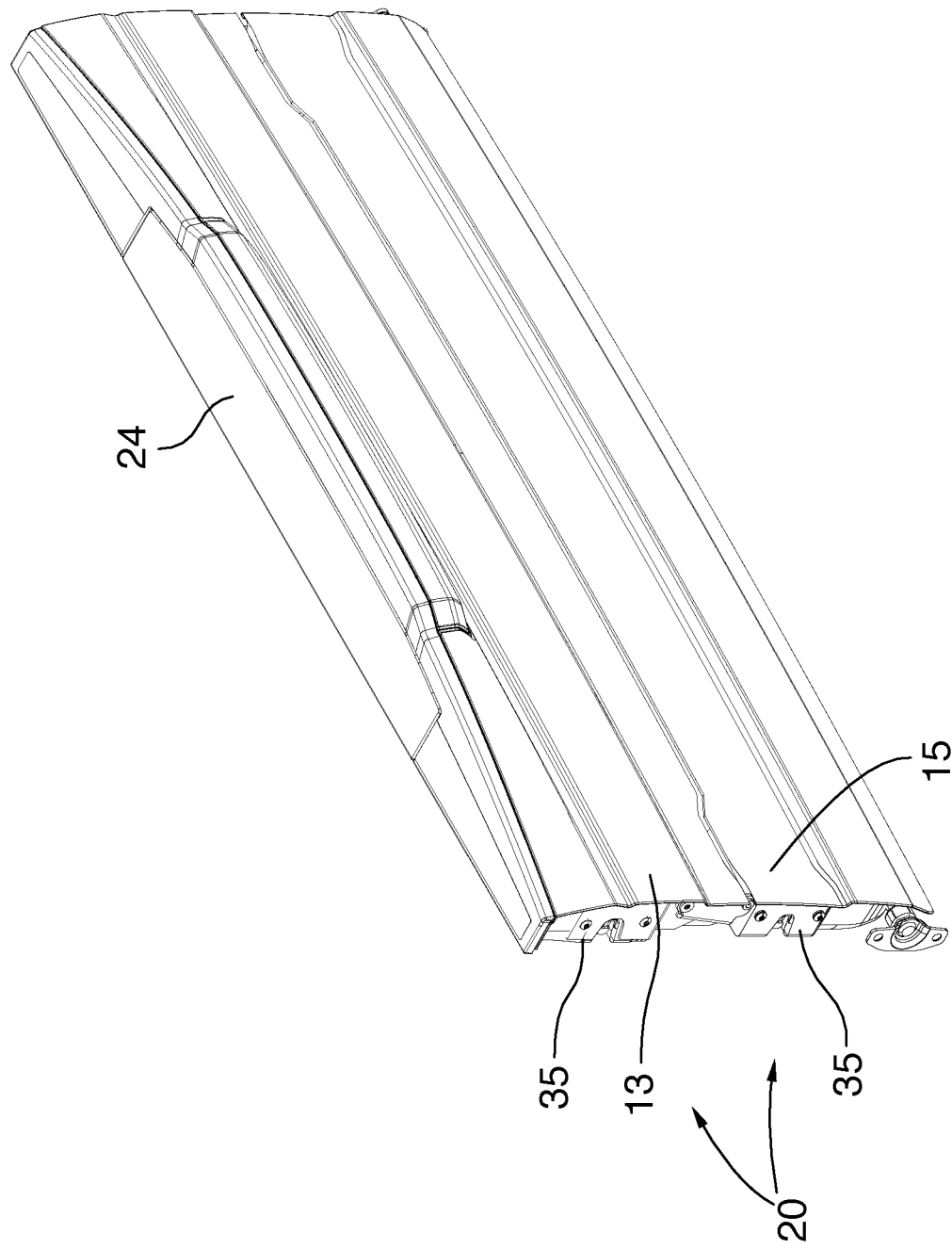
FIG. 15 is an isolated perspective view of the tailgate with an additional locking mechanism with the upper section and the lower section co-planar and oriented vertically upward.
Figure 16:
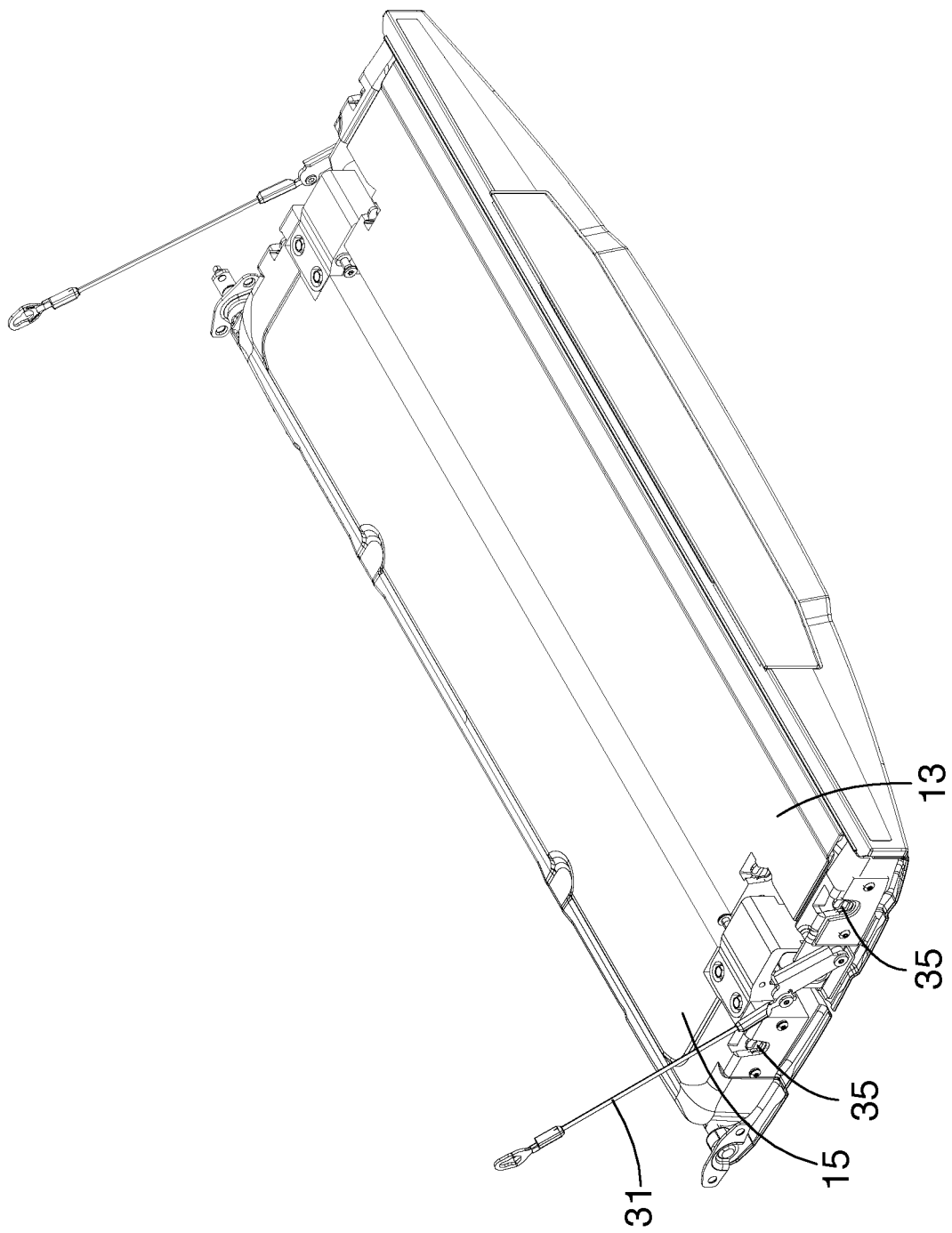
FIG. 16 is an isolated perspective view of the tailgate with an additional locking mechanism with the upper section and the lower section co-planar and oriented horizontally.
Figure 17:
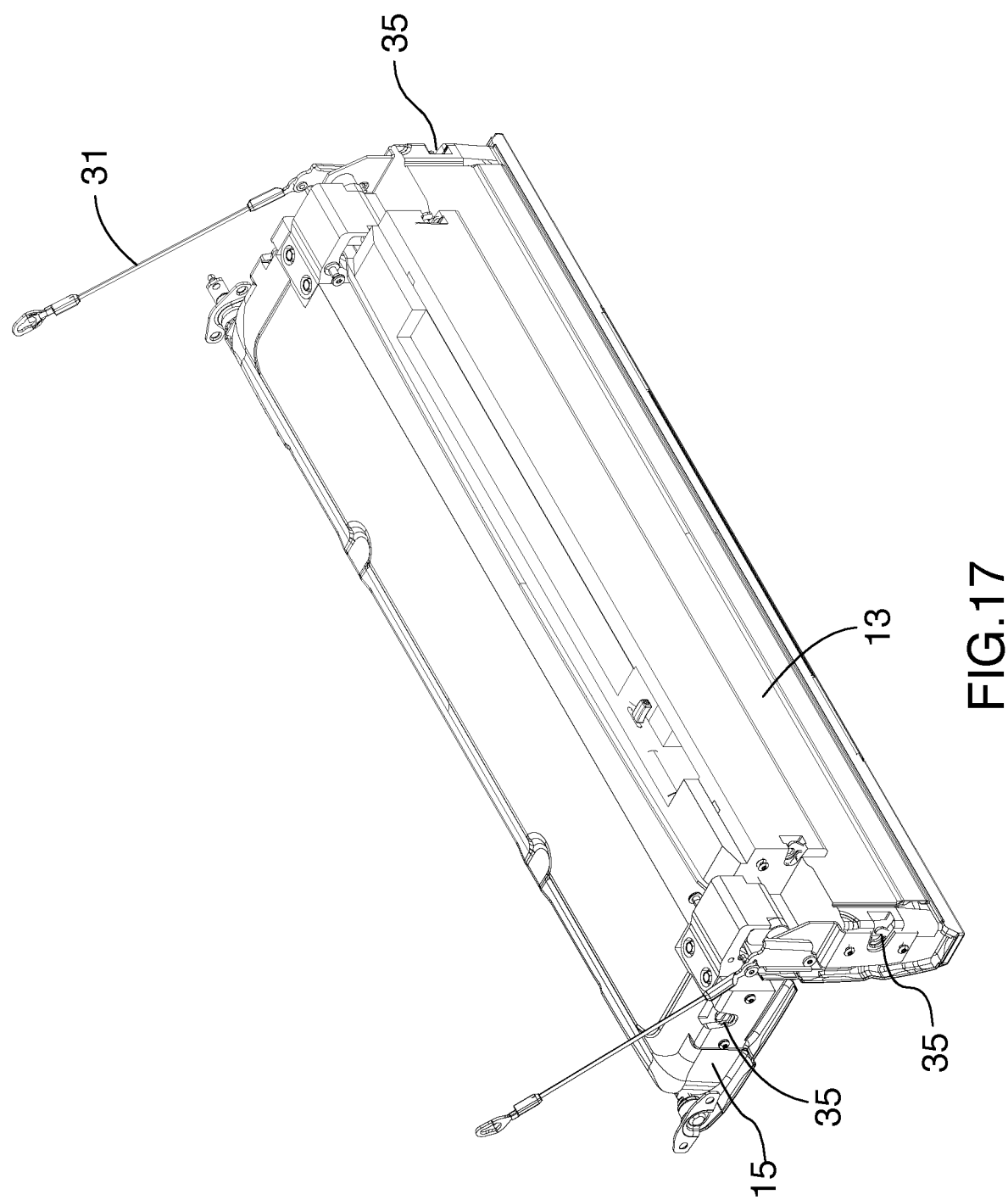
FIG. 17 is an isolated perspective view of the tailgate with an additional locking mechanism with the lower section oriented horizontally and the upper section opened outwardly and oriented downwardly.
Figure 18:
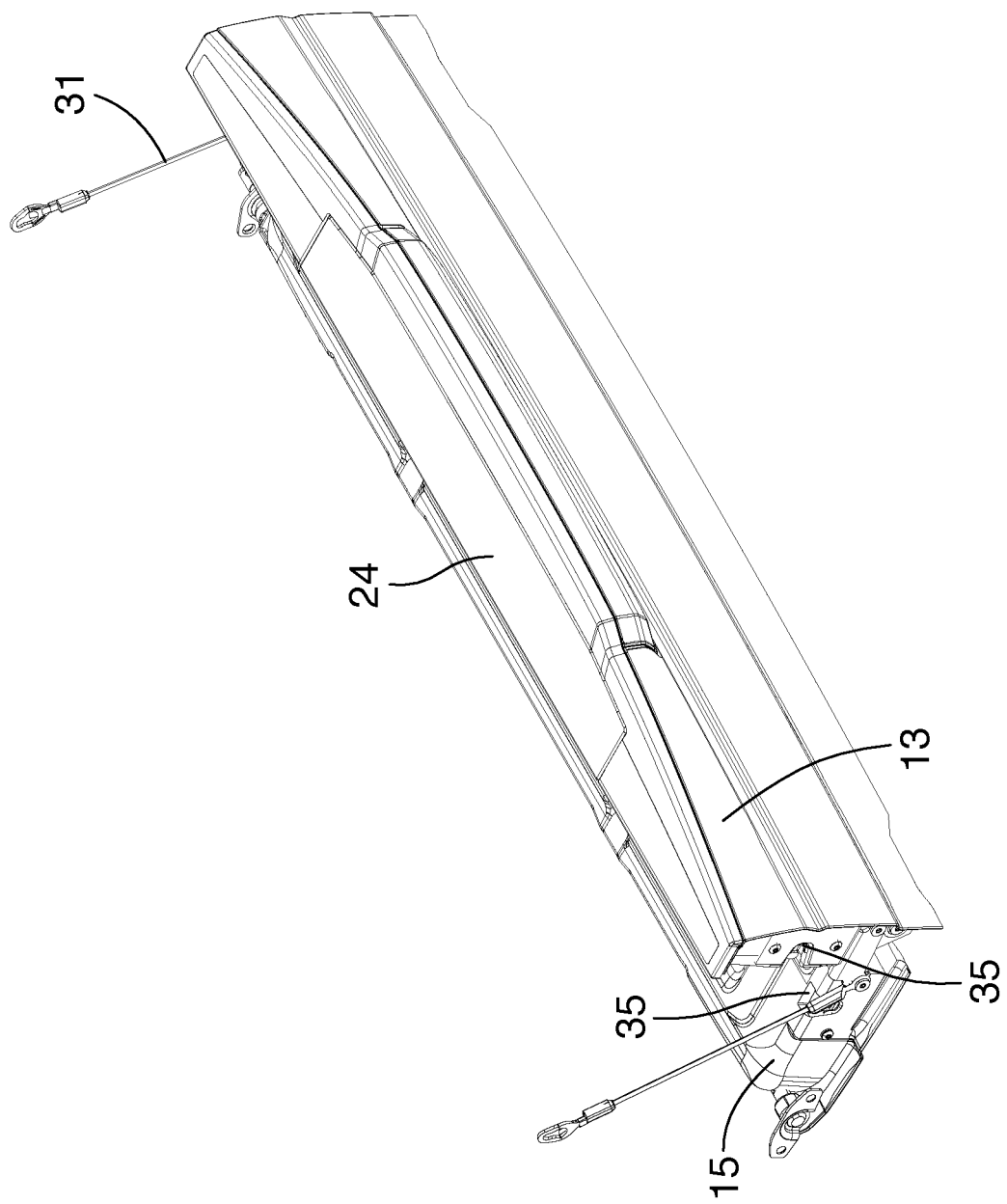
FIG. 18 is an isolated perspective view of the tailgate with an additional locking mechanism with the lower section oriented horizontally and the upper section rotated inwardly and oriented upwardly.
Figure 19:
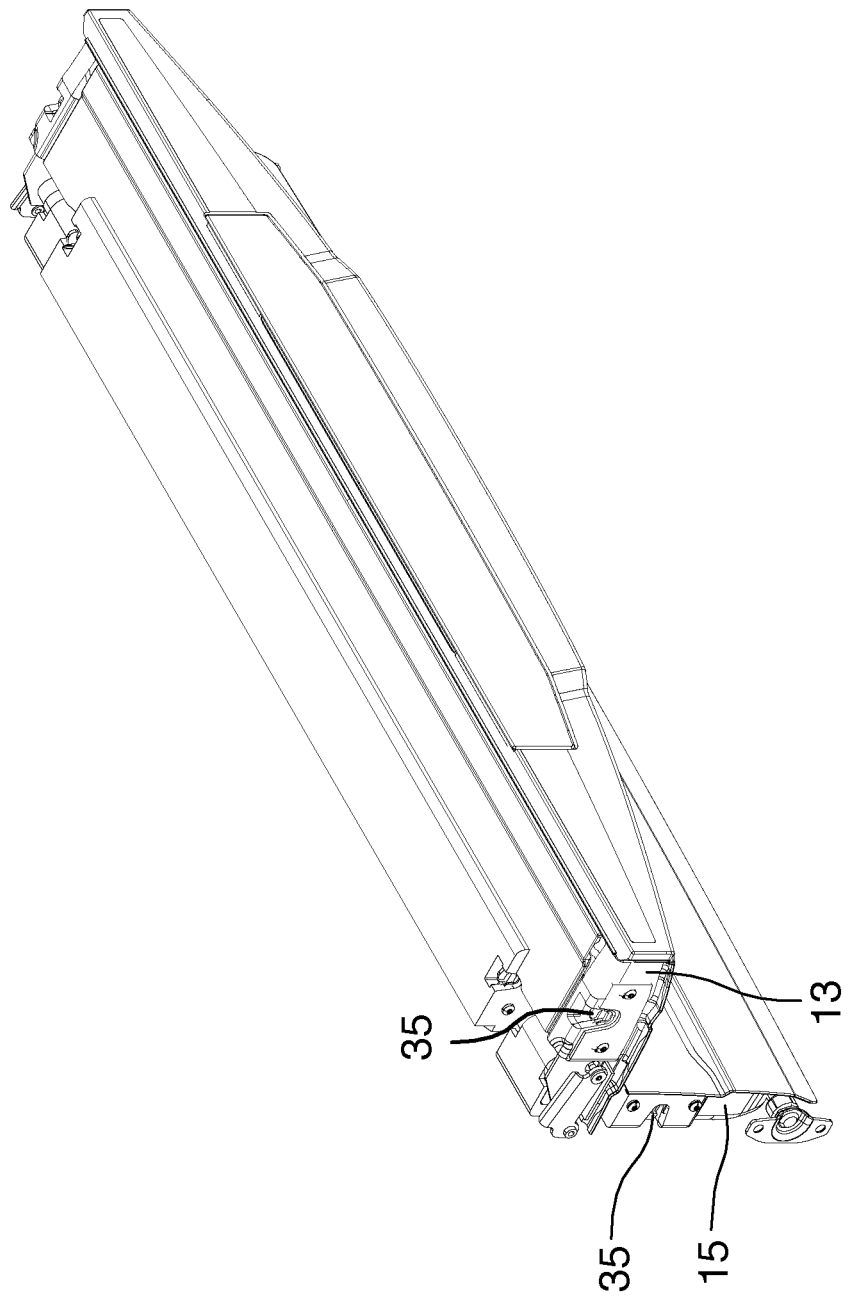
FIG. 19 is an isolated perspective view of the tailgate with an additional locking mechanism with the lower section oriented vertically upward and the upper section rotated open and oriented horizontally.

FIG. 13 illustrates the upper section 13 rotated inwardly or interiorly in relation to the lower section 15. In this latching configuration, the latching pin 29 is releasably captured in orifice C. This FIG. 13 latching configuration applies to the tailgate configuration of FIG. 5.

FIGS. 15 to 19 illustrate tailgate orientations corresponding to those of FIGS. 10 to 14 respectively, but with an additional locking mechanism 20. The additional locking mechanism 20 is required to hold the lower section 15 to the support arms 9 when the lower section 15 is in the closed position, and the upper section 13 to the support arms 9 when the upper section is in the closed position co-planar with the lower section 15. In this embodiment, the locking mechanism 20 comprises at least one latch 35 on each of the upper section 13 and lower section 15. The latches 35 are favourably located on opposite transverse ends of each of the upper section 13 and lower section 15. These latches 35 typically engage with strikers mounted to the support arms 9, typically the D-pillars, in a conventional manner. In some tailgate orientations, the latches 35 are not engaged. Latches 35 holding the lower section 15 to the support arms 9 are illustrated in FIGS. 1, 6, 9, 10, 14, 15 and 19. Latches 35 also holding the upper section 13 to the support arms 9 are illustrated in FIGS. 1, 9, 10 and 15.

Additional functionality is provided by an extendible step assembly 23. The extendible step assembly 23 typically comprises a transverse step 24 mounted on telescoping arms 26 which move into and out of the upper section 13. When stowed, the step 24 is typically flush with an uppermost or outermost side of the upper section. The telescoping arms 26 are typically rotationally connected to base supports. This rotational connection of the support arms 26 to the base supports allows the step assembly 23 to be rotated. The step assembly 23 may be co-planar with the upper section 13 or may be rotated interiorly or exteriorly of the plane of the upper section 13 of the door 11.

Figure 7:
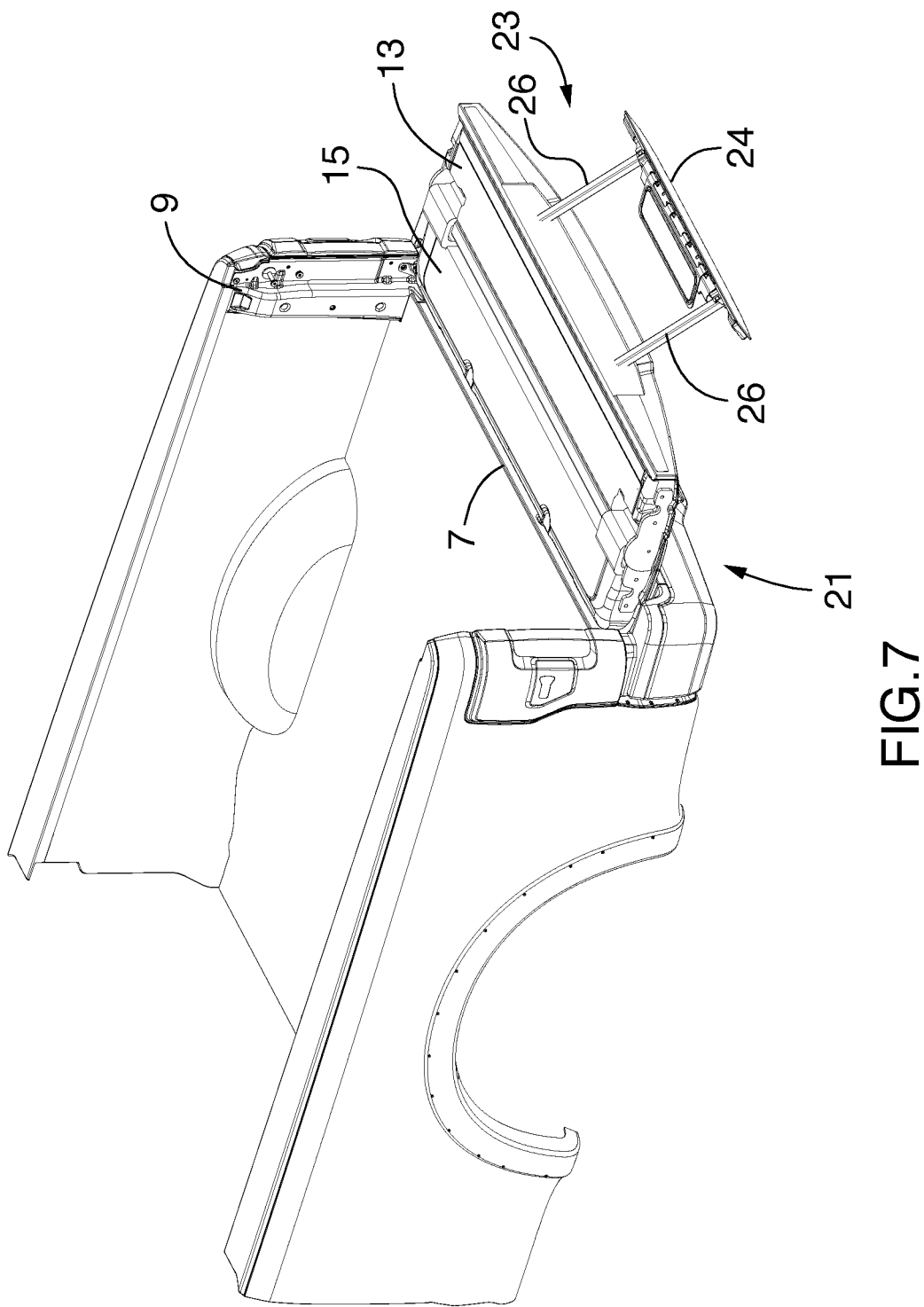
FIG. 7 is the view of FIG. 2 with the step assembly deployed and rotated exteriorly in relation to the upper section.
Figure 8:
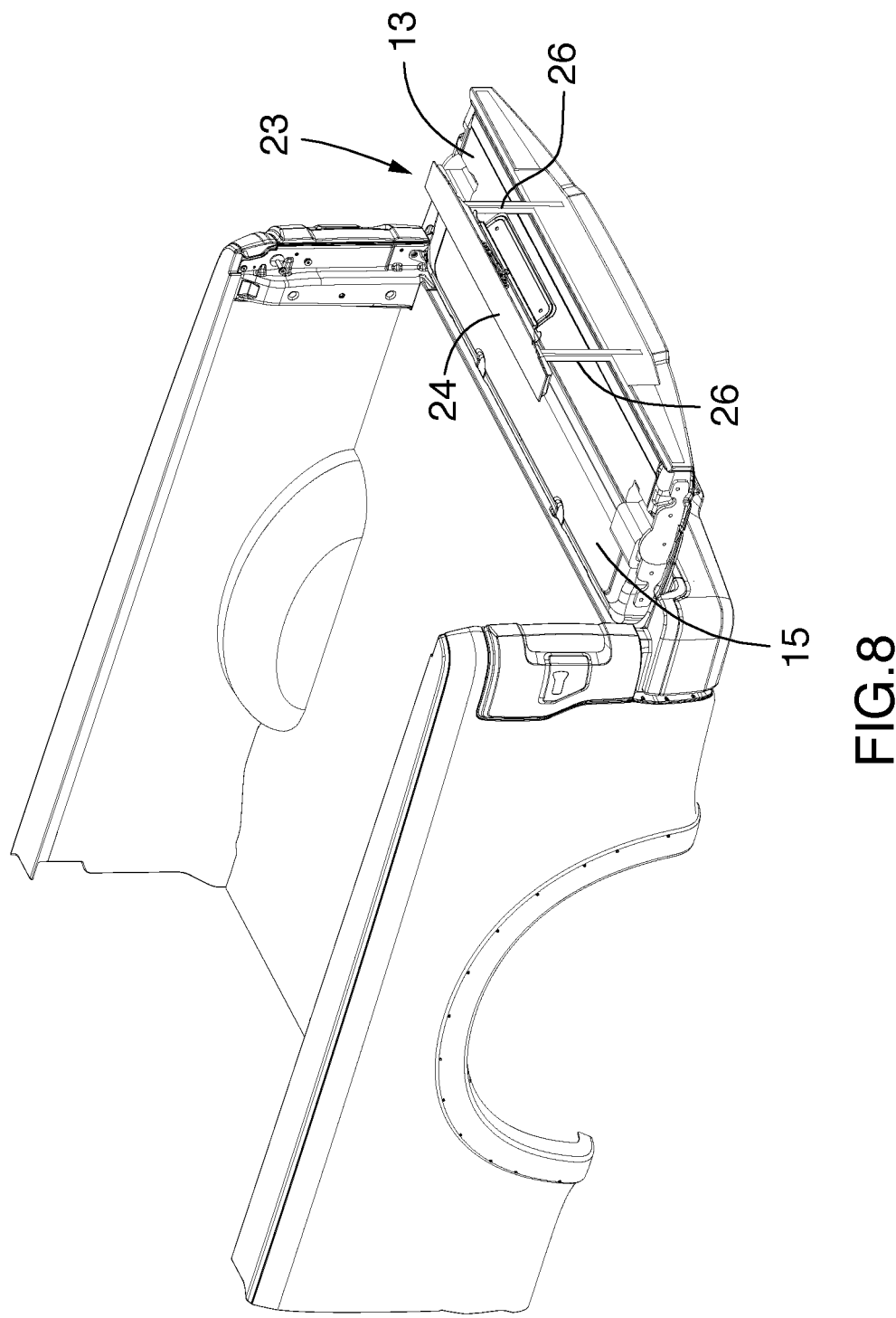
FIG. 8 is the view of FIG. 2 with the step assembly deployed and rotated interiorly in relation to the upper section.

The step assembly 23 is shown in a stowed configuration in FIGS. 1, 2, 5 and 6. When stowed, only the step 24 portion of the step assembly 23 is visible. The telescoping arms 26 are adapted to be locked to the upper section 13 in various orientations, or simply to swivel and to be held by gravity. FIG. 4 illustrates the step assembly 23 deployed and rotated interiorly in relation to the upper section 13 to act as a user step, with the lower section 15 rotated open to horizontal and the upper section 13 rotated downwardly. FIG. 7 illustrates the step assembly 23 rotated exteriorly in relation to the upper section 13 with the lower section 15 rotated open to horizontal and the upper section 13 co-planar with the lower section 15 in the horizontal orientation. In this orientation, the step 24 is somewhat higher off the ground than in the orientation shown in FIG. 4. FIG. 8 illustrates the upper section 13 and the lower section 15 both in the horizontal position, but with the step assembly 23 rotated interiorly to act, for example, as a load barrier to prevent cargo from slipping out of the cargo hold 3. FIG. 9 illustrates the tailgate assembly 1 in the closed orientation, with both the lower section 15 and the upper section 13 co-planar and vertical, and the step assembly 23 rotated exteriorly to act, for example, as a bicycle rack.

The tailgate assembly may also be provided with an extendible handle 25. The handle 25 is preferably transversely nested in the upper section 13 adjacent the lower section 15, as illustrated in FIGS. 3 and 4. Alternatively, the handle 25 may be nested in the lower section 15 adjacent the upper section 13, as illustrated in FIGS. 11 and 12. In the configuration illustrated in FIGS. 3 and 4, the handle 25 is rotationally joined to the upper section 13 at one end in a conventional manner. Preferably, in this configuration, when the lower section 15 and the upper section 13 are in a co-planar orientation, the handle 25 is not visible since it lies between adjacent faces of the upper section 13 and lower section 15. In this configuration with the handle nested in the upper section 13, when the upper section is rotated open 270 degrees, the handle 25 is exposed and may be grabbed at its free end by a user. For a handle nested in the lower section 15, the handle 25 is exposed when the upper section 13 is rotated open to 180 degrees or more. When the handle 25 is rotated to an upright orientation, it can be held in place using a conventional releasable lock located where the handle 25 is rotationally joined to the upper section 13, or the lower section 15, as the case may be. As illustrated in FIG. 4, the upright handle 25 provides useful support for a user to enter the cargo hold 3 when stepping on the deployed step 24.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A vehicle tailgate assembly comprising:
    a frame with a transverse base and support arms extending perpendicularly therefrom adjacent distal ends of the transverse base;
    a door rotationally mounted to the frame between the support arms;
    the door comprising a transverse upper section rotationally joined to a transverse lower section at a rotational joint;
    the transverse upper section being rotatable about the rotational joint 90 degrees from co-planar in either direction in relation to the transverse lower section;
    each of the upper section and the lower section extending transversely between the support arms and adapted to releasably engage said support arms;
    a releasable locking mechanism located adjacent the rotational joint;
    said releasable locking mechanism adapted to releasably hold the upper section in relation to the lower section at selected orientations.

2. The vehicle tailgate assembly of claim 1, wherein the upper section and the lower section are aligned linearly when the door is closed and when the door is rotated open perpendicular to the support arms.

3. The vehicle tailgate assembly of claim 1, wherein the lower section is rotated open perpendicular to the support arms and the upper section is rotated downwardly perpendicular to the lower section.

4. The vehicle tailgate assembly of claim 1, wherein the lower section is rotated open perpendicular to the support arms and the upper section is rotated upwardly perpendicular to the lower section.

5. The vehicle tailgate assembly of claim 1, wherein the lower section is closed and parallel to the support arms and the upper section is rotated open perpendicular to the support arms.

6. The vehicle tailgate assembly of claim 1, wherein the upper section is rotationally joined to the lower section by a hinge.

7. The vehicle tailgate assembly of claim 1, wherein the releasable locking mechanism comprises at least one latch.

8. The vehicle tailgate assembly of claim 7, wherein the at least one latch is configured to provide multiple latching positions.

9. The vehicle tailgate assembly of claim 1, wherein an extendible step assembly is mounted within the upper section of the door.

10. The vehicle tailgate assembly of claim 9, wherein the step assembly when extended may be locked into a position on a plane, interiorly of the plane or exteriorly of the plane of the upper section of the door.

11. The vehicle tailgate assembly of claim 1, wherein a lower portion of the upper section adjacent the lower section is provided with an extendible handle for user support during entry and exit from a vehicle cargo hold.

12. The vehicle tailgate assembly of claim 1, wherein an upper portion of the lower section adjacent the upper section is provided with an extendible handle for user support during entry and exit from a vehicle cargo hold.

13. The vehicle tailgate assembly of claim 1, comprising an additional locking mechanism to releasably hold the lower section to the support arms.

14. The vehicle tailgate assembly of claim 13, wherein the additional locking mechanism further releasably holds the upper section to the support arms.

15. The tailgate assembly of claim 14, wherein the additional locking mechanism comprises latches.

16. The tailgate assembly of claim 13, wherein the additional locking mechanism comprises latches.

* * * * *